United States Patent Office 3,396,046
Patented Aug. 6, 1968

3,396,046
SOLVENT DISPERSION OF SILICA PARTICLES AND TREATMENT OF POLYESTER AND POLYCARBONATE SUBSTRATES THEREWITH
Raphael Landau, Woodford Green, Essex, England, assignor to Ozalid Company Limited, Loughton, Essex, England, a British company
No Drawing. Filed Aug. 19, 1963, Ser. No. 303,181
Claims priority, application Great Britain, Aug. 22, 1962, 32,184/62
9 Claims. (Cl. 106—287)

The present invention relates to the surface treatment of polyester materials and more particularly to the treatment of the surface of such materials so that a subsequently applied coating will adhere firmly to said surface.

Considerable difficulty has been experienced in the application of coatings to the surface of polyester and polycarbonate materials so that they firmly adhere to the surface and do not show a tendency to peel or flake. In general, the method of applying coatings to the surface of polyester materials has involved the use of elevated temperatures for a relatively long period of time.

We have now found that by treating the surface of the polyester material in accordance with the present invention a subsequently applied coating will firmly adhere to the surface of the polyester material.

According to the present invention there is provided a method of treating the surface of a polyester or polycarbonate material to facilitate adhesion to the surface of a subsequently applied coating, which method consists in the application to it of a substantially uniform layer of adherent particles of finely divided silica, said layer being applied to the surface with a solvent dispersion of silica particles containing a wetting agent and one or more chloro-substituted organic acids from the group trichloroacetic, trichloropropionic and dichloroacetic acid. It is preferred that the particle size of the silica is not more than 5 microns, the silica commercially available under the registered trademark "Aerosil" being particularly suitable.

The surface to be treated may be the surface or surfaces of a sheet or film of polyester or polycarbonate material or may be the surfaces of yarns or threads formed of polyester or polycarbonate materials. The invention has particular application to the treatment of polymethylene terephthalates, such for example as polyethylene terephthalate, to facilitate the adhesion of a subsequently applied coating to the surface of said material. The material sold under the registered trademark "Melinex" when treated in accordance with the present invention may be readily coated by normal coating techniques with any desired coating layer.

In this way, it is possible to provide a film of polyester or polycarbonate material with a firmly adherent coating of a lacquer or hydrophilic colloid which may be sensitised with light sensitive compositions.

The wetting agent may be present in a proportion of 0.05% to 0.2% by weight and may be one which retains its wetting properties in the presence of the acid and during drying of the dispersion on the surface of the material treated. The wetting agent may be a fluorocarbon compound such as that sold by Minnesota Mining and Manufacturing Company under the trade name FC.95 or a sulphonated oil such as that sold by Imperial Chemical Industries under the registered trademark Calsolene Oil HS.

The solvent dispersion, which may be an aqueous dispersion, may contain 0.1% to 20% and preferably 2% to 10% by weight of the chloro-substituted organic acid and 0.01% to 10% by weight of finely divided silica.

The invention also provides a composition for treating the surface of polyester materials which consists of a solvent dispersion containing 0.01% to 10% by weight of silica having a particle size of not greater than 5 microns, 0.1% to 20% by weight of a chloro-substituted organic acid from the group trichloroacetic, trichloropropionic and dichloroacetic acid and a proportion of a wetting agent.

The proportion of chloro-substituted organic acids in the composition may be within the range 2% to 10% by weight.

By treating the surface or surfaces of polyester materials in accordance with the present invention, when the dispersion of finely divided silica is caused or allowed to dry, the silica keys firmly to the surface of the material and provides the material with a surface to which subsequently applied coatings will firmly adhere.

It will be appreciated by those skilled in the art that the quantity of the treating composition applied to the surface should be sufficient to result in a coating of silica particles sufficient to key the subsequently applied coating to the treated surface.

Following is a description by way of example of methods carrying the invention into effect.

EXAMPLE 1

A composition was prepared containing:
Water _____ litres__ 28
Trichloroacetic acid _____ kilos__ 4.0
Dispersion of 8% of silica in water _____ litres__ 10
Calsolene Oil HS in water _____ do____ 1

The Calsolene Oil HS which was used as a wetting agent in this example was made up as a 10% solution in water prior to use.

A film of the polyester material commercially available under the registered trademark "Melinex" was coated with the above composition to give a coating weight of 10 to 20 grams per square yard of film. The coated film was dried in air at a temperature of 50° C.

The resulting film was found to contain silica particles firmly bonded thereto. A coating of lacquer subsequently applied to the treated film surface was found to be firmly bonded thereto. In comparison a film of "Melinex" was coated with the same lacquer but not treated in accordance with the present invention, and in this case the coating, when dry, was found to easily flake or peel from the surface of the material.

EXAMPLE 2

A composition was made up comprising:
Water _____ litres__ 28
2,2,3-trichloropropionic acid _____ kilos__ 4.5
8% dispersion silica in water _____ litres__ 10
10% solution of Calsolene Oil HS in water__ do____ 1

The 10% solution of wetting agent (Calsolene Oil HS) was prepared prior to use.

A film of polyethylene terephthalate was coated with the above composition to give a coating weight of 15 grams per square yard of film and the coated film was subsequently dried in air at a temperature of 80° C.

After drying, the surface of the polyethylene terephthalate film contained silica particles firmly bonded thereto which permitted a subsequently applied lacquer coating to adhere firmly to the surface.

EXAMPLE 3

The process described in Example 1 was repeated except that instead of trichloroacetic acid, 4 litres of dichloroacetic acid were used.

A film of polyester material available under the registered trademark "Melinex" was treated as described in Example 1. A coating of lacquer applied to the treated surface was found to be firmly bonded thereto and showed no tendency to flake or peel from the surface of the material.

What I claim as my invention and desire to secure by Letters Patent is:

1. A method of treating the surface of a polyester or polycarbonate material to facilitate adhesion to said surface of a subsequently applied coating, said method comprising applying to said surface a substantially uniform layer of adherent particles of silica of a particle size not greater than 5 microns by treating said surface with an aqueous dispersion of about 0.01 to 10% by weight of silica particles, from about 0.05% to 0.2% by weight of a sulphonated oil wetting agent, and from about 0.1 to 20% by weight of at least one chloro-substituted organic acid selected from the group consisting of trichloroacetic, trichloropropionic, and dichloroacetic acid.

2. A method as claimed in claim 1 in which a sheet or film of polyester material is treated.

3. A method as claimed in claim 1 wherein the polyester material is a polymethylene terephthalate.

4. A method as claimed in claim 1 wherein the aqueous dispersion contains 2% to 10% by weight of the chloro-substituted organic acid.

5. A method as claimed in claim 1 wherein the trichloropropionic acid is 2:2:3 trichloropropionic acid.

6. The method as claimed in claim 3 wherein said polymethylene terephthalate is polyethylene terephthalate.

7. Polyester materials whenever treated by the method of claim 1.

8. A composition for treating the surface of polyester and polycarbonate materials, said composition comprising an aqueous dispersion containing from about 0.01% to about 10% by weight of silica of a particle size not greater than 5 microns, from about 0.1% to 20% by weight of a chloro-substituted organic acid selected from the group consisting of trichloroacetic, trichloropropionic and dichloroacetic acids, and from about 0.05% to 0.2% by weight of a sulphonated oil wetting agent.

9. A composition as claimed in claim 8 wherein the proportion of chloro-substituted organic acid is within the range 2% to 10% by weight.

References Cited

UNITED STATES PATENTS

| | | | |
|---|---|---|---|
| 2,848,350 | 8/1958 | Yeager | 117—47 |
| 2,943,937 | 7/1960 | Nadeau et al. | 117—47 |
| 3,022,192 | 2/1962 | Brandt | 117—47 |
| 3,142,609 | 8/1964 | Deretchin et al. | 161—39 |

ALLAN LIESERMAN, *Primary Examiner.*